(12) United States Patent
Richter

(10) Patent No.: US 11,810,478 B1
(45) Date of Patent: Nov. 7, 2023

(54) METHODS AND SYSTEMS FOR AN ELECTRIC AIRCRAFT COACHING SIMULATOR

(71) Applicant: BETA AIR, LLC, South Burlington, VT (US)

(72) Inventor: Timothy Gerard Richter, Wynantskill, NY (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/892,442

(22) Filed: Aug. 22, 2022

(51) Int. Cl.
| | | |
|---|---|---|
| G09B 9/24 | (2006.01) | |
| G09B 9/16 | (2006.01) | |
| G06N 20/00 | (2019.01) | |
| G09B 9/34 | (2006.01) | |
| G09B 9/30 | (2006.01) | |

(52) U.S. Cl.
CPC ............. *G09B 9/16* (2013.01); *G06N 20/00* (2019.01); *G09B 9/24* (2013.01); *G09B 9/308* (2013.01); *G09B 9/34* (2013.01)

(58) Field of Classification Search
CPC . G09B 9/16; G09B 9/34; G09B 9/308; G09B 9/24; G06N 20/00

USPC .......................................................... 434/49
See application file for complete search history.

(56) References Cited

U.S. PATENT DOCUMENTS

| | | | |
|---|---|---|---|
| 9,561,860 B2 | 2/2017 | Knapp | |
| 11,281,237 B1 | 3/2022 | Giroux | |
| 2019/0033862 A1* | 1/2019 | Groden | ............... G08G 5/0086 |
| 2020/0277080 A1 | 9/2020 | Wiegman | |
| 2020/0391876 A1 | 12/2020 | Morrison | |

* cited by examiner

*Primary Examiner* — Kesha Frisby
(74) *Attorney, Agent, or Firm* — CALDWELL INTELLECTUAL PROPERTY LAW

(57) ABSTRACT

A system and method for an electric aircraft coaching simulator is illustrated. The simulator includes a pilot control that is configured to generate a pilot command. The simulator includes a processor that is configured to receive optimized flight data, simulate a battery performance of an electric aircraft as a function of the received pilot command and generate an optimal flight recommendation based off the optimized flight data. The simulation model is configured to communicatively connect with the flight simulator to mimic a real flight situation. Optimized flight data from other pilots can be used to coach pilots how to fly with more energy efficiency.

20 Claims, 9 Drawing Sheets

METHODS AND SYSTEMS FOR AN ELECTRIC AIRCRAFT COACHING SIMULATOR

FIELD OF THE INVENTION

The present invention generally relates to the field of aircraft simulation. In particular, the present invention is directed to a system and method for an electric aircraft coaching simulator.

BACKGROUND

When flying electric aircraft, energy conservation is important. However, it is difficult to specifically coach pilots on energy conservation. Particularly, it is difficult to provide real time feedback to pilots on their flying. Existing solutions to this problem are not satisfactory.

SUMMARY OF THE DISCLOSURE

In an aspect a system for an electric aircraft coaching simulator. The simulator includes a pilot control that is configured to generate a pilot command. The simulator also includes a processor and a memory connected to the at least a processor, with instructions configuring the at least a processor to receive optimized flight data, simulate a battery performance of an electric aircraft as a function of a received pilot command, generate an optimal flight recommendation and communicate the optimal flight recommendation to a user.

In another aspect a method for generating an electric coaching simulator. The method includes at least a processor and a memory connected to the at least a processor configuring the at least a processor to generate the simulator by receiving optimized flight data, simulating a batter performance of an electric aircraft as a function of a received pilot command, generating an optimal flight recommendation, and communicate the optimal flight recommendation to the user as a function of the optimized flight data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating an electric aircraft coaching simulator. In an embodiment, the electric aircraft coaching simulator coaches pilots to be more efficient and consume less energy during flight time. The simulator may prepare pilots for real time flights on an electric aircraft.

Aspects of the present disclosure can be used to rank pilot flight time data. This is so, at least in part, because pilot flight time data is measurable using data obtained from energy source conditions and recorded flight maneuvers.

Exemplary embodiments illustrating aspects of the present disclosure are described below in the context of several specific examples.

Figure 1:
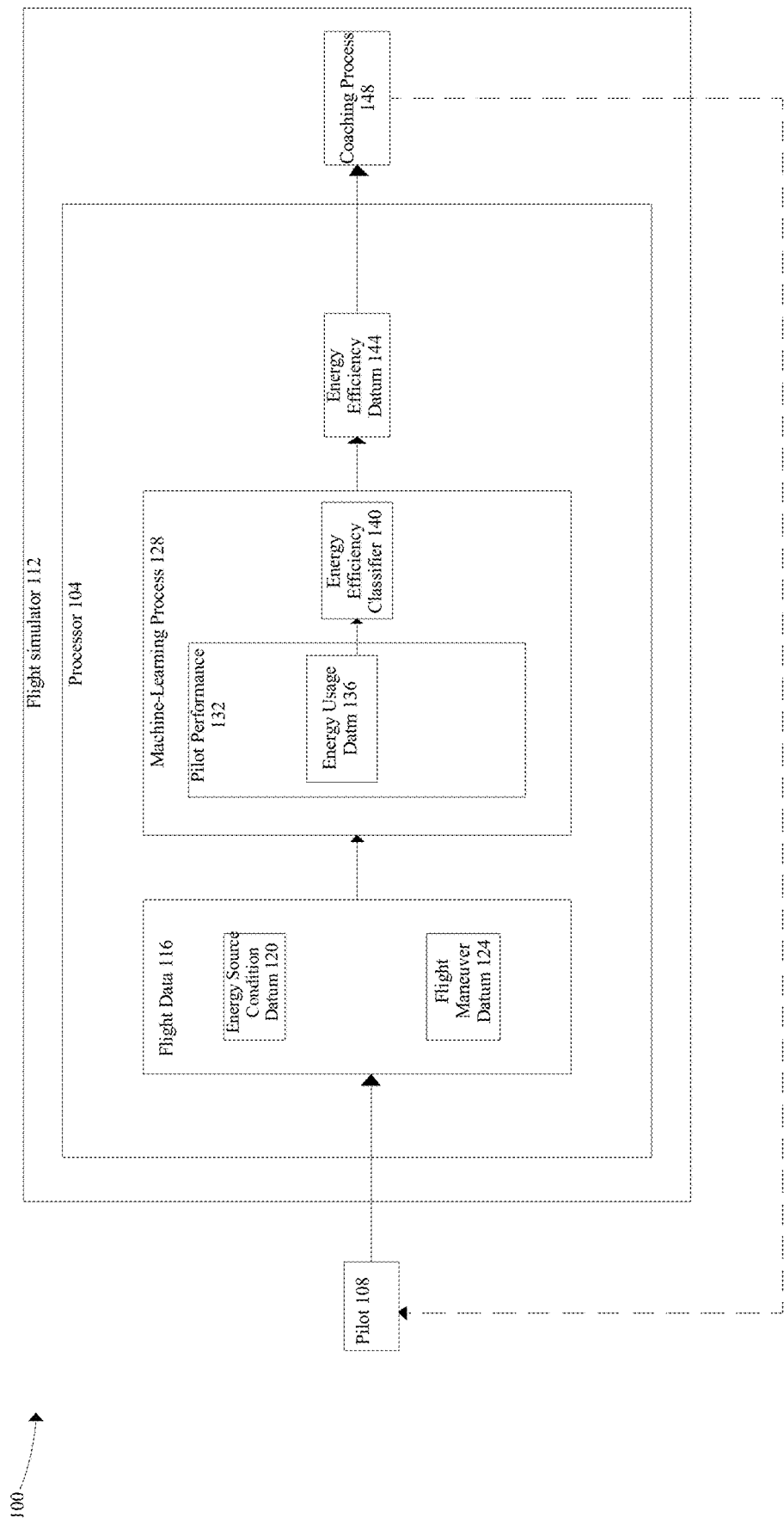
FIG. 1 is a block diagram of a system for an electric aircraft coaching simulator.

Referring now to FIG. 1, an exemplary embodiment of an apparatus 100 for an electric aircraft coaching simulator is illustrated. System may include a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device and/or processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referencing FIG. 1, pilot 108 may operate flight simulator 112. A "pilot" as used herein, refers to a user that operates the flying controls of an aircraft, whether simulated or actual. In this disclosure, a "flight simulator" is a device that artificially re-creates aircraft flight and the environment in which it flies. For example, a pilot is being onboarded and needs to learn to operate the aircraft without actually flying in real time. A flight simulator can be used to mimic actual flying conditions, without endangering the pilot or passengers while the pilot is learning how to navigate the aircraft. A flight simulator isn't only used for training new pilots, it can also be used to coach pilots on new techniques or methods to be more energy efficient or fly with new conditions.

Referencing FIG. 1, flight simulator 112 may include an augmented reality device, a virtual reality device, a display, or the like. In this disclosure, a "flight simulator" is a device that artificially re-creates aircraft flight and the environment in which it flies. Simulator module may include actual aircraft components that have been separated from a functioning aircraft or otherwise de-activated. A simulator module may include a model or replica. In some cases, simulator module may include a physical twin of at least an aircraft component. In some cases, simulator module may include a physical cockpit. Flight simulator may include a plurality of flight simulator components that may include a seat, avionics controls, dashboard, the plurality of displays, inceptor stick, pedals, user device, a part replicating a fuselage, and the like. Adjacent displays may be aligned next to each other in any order or formation. In a non-limiting embodiment, adjacent displays may include 4 projectors. Adjacent displays may include a primary flight display configured to be at the center of the alignment of displays. Adjacent displays may be collapsible, modular, foldable, separable, etc. Flight simulator components may be modular, interchangeable, separable, collapsible, and the like.

For the purposes of this disclosure, computing device 100 may include a pilot display. A "pilot display" as used herein, refers to an electronic device for the visual presentation of information. Pilot Display may be any type of screen. As non-limiting examples, pilot display may be an LED screen, an LCD screen, an OLED screen, a CRT screen, a DLPT screen, a plasma screen, a cold cathode display, a heated cathode display, a nixie tube display, and the like. Pilot display may be configured to display any relevant information. A person of ordinary skill in the art would appreciate, after having reviewed the entirety of this disclosure, that a variety of information could be displayed on pilot display.

Flight simulator 112 may include a graphical user interface (GUI) displayed on display. Pilot display may include one or more screens. Pilot display may include one or more projectors configured to project an image onto one or more screens. As an example, and without limitation, GUI may be displayed on any electronic device, as described herein, such as, without limitation, a computer, tablet, remote device, and/or any other visual display device. GUI may be configured to present to pilot information related to the flight plan. In one embodiment, the one or more screens may be multi-function displays (MFD). As an alternative to the screens or in conjunction with the screens, aircraft simulation may include a primary display, gauges, graphs, audio cues, visual cues, information on a heads-up display (HUD) or a combination thereof. Pilot display may include a display disposed in one or more areas of an aircraft, one or more computing devices, or a combination thereof.

Still referring to FIG. 1, pilot display may be an augmented reality display. As used in this disclosure, an "augmented reality" display is a display that permits a user to view a typical field of vision of the user and superimposes virtual images on the field of vision. As an example, and without limitation, GUI may be displayed on any electronic device, as described herein, such as, without limitation, a computer, tablet, remote device, and/or any other visual display device. Pilot display 136 may make use of reflective waveguides, diffractive waveguides, lenses, or the like to transmit, project, and/or display images. Pilot display may include a view window, defined for the purposes of this disclosure as a portion of the augmented reality device that admits a view of field of vision; view window may include a transparent window, such as a transparent portion of goggles such as lenses or the like. Alternatively, view window may include a screen that displays field of vision to user. Pilot display may include a projection device, defined as a device that inserts images into field of vision. Where view window is a screen, projection device may include a software and/or hardware component that adds inserted images into a display signal to be rendered on display 116. Pilot display may include a liquid crystal display (LCD) and/or one or more projected lasers. Pilot display may include a heads-up display (HUD). In some embodiments, pilot display may display images on one or more transparent surfaces. One or more transparent surfaces may be windows of the aircraft, such as cockpit windows, or other transparent surfaces. In some embodiments, pilot display may include an augmented reality headset. For instance, and without limitation, pilot display may project images through and/or reflect images off an eyeglass-like structure and/or lens piece, where either both field of vision and images may be so displayed, or the former may be permitted to pass through a transparent surface. Pilot display may be incorporated in a contact lens or eye tap device, which may introduce images into light entering an eye to cause display of such images. Pilot display may display some images using a virtual retina display (VRD), which may display an image directly on a retina of a user.

Still referring to FIG. 1, pilot display may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in an augmented reality device. In some embodiments, pilot display includes a touch screen to receive input from a user. Additional disclosure related to display screen recommendations may be found in U.S. patent application Ser. No. 17/320,329, filed on May, 14, 2021, and entitled "SYSTEMS AND METHODS FOR MONITONRING HEALTH OF AN ELECTRIC VERTICAL TAKE-OFF AND LANDING VEHICLE," the entirety of each which in incorporated herein by reference.

Still referencing FIG. 1, flight simulator 112 may further include processor 104 that may be configured to receive optimized flight data 116. Processor 104 may take optimized flight data 116 and parse through for information related to energy consumption, battery life, energy efficiency, and the like. Processor 104 may integrate optimized flight data with the coaching aspect of the simulation so that coaching capabilities are gears towards helping pilots become more energy efficient and optimize battery performance. Processor 104 may include an integrated electric aircraft model. The term "integrated" as used herein, means an electric aircraft model with various parts or aspects linked or coordinated. The integrated electric aircraft model may be configured to simulate the battery performance of the electric aircraft as a function of the received pilot command, provide optimal flight recommendation, and/or update the integrated electric aircraft model as a function of the processor 104.

Further referencing FIG. 1, the integrated electric aircraft model may include any model of a system of the electric aircraft, such as a conceptual model, a model of a reactive behavior of a system, and the like. Simulation of the battery performance may include simulating the thermal performance of the battery, the reaction of the battery system to the pilot command, the state of charge, the state of health and the like. Simulation of the battery performance may be validated with information from live flights. In a non-limiting embodiment, battery validation may occur when battery simulation metrics, such as voltage power, electrical usage, and the like are correctly outputted to match the battery metrics from a live flight. Battery validation may be conducted using sensors, signals, electrical monitoring, energy monitoring, or the like. The electric aircraft may be any aircraft powered only by electricity, such as one or more electric motor and/or battery system. Battery performance may include the performance of a power source. As used in this disclosure, a "power source" is a source of electrical power, for example charging a battery. In some cases, power source may include a charging battery (i.e., a battery used for charging other batteries. A charging battery is notably contrasted with an electric vehicle battery, which is located for example upon an electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Power source may house a variety of electrical components. In one embodiment, power source may contain a solar inverter. Solar inverter may be configured to produce on-site power generation. In one embodiment, power generated from solar inverter may be stored in a charging battery. Power source may have a continuous power rating of at least 350 kVA. In other embodiments, power source may have a continuous power rating of over 350 kVA. In some embodiments, power source may have a battery charge range up to 950 Vdc. In other embodiments, power source may have a battery charge range of over 950 Vdc. In some embodiments, power source may have a continuous charge current of at least 350 amps. In other embodiments, power source may have a continuous charge current of over 350 amps. In some embodiments, power source may have a boost charge current of at least 500 amps. In other embodiments, power source may have a boost charge current of over 500 amps. In some embodiments, power source may include any component with the capability of recharging an energy source of an electric vehicle. In some embodiments, power source may include a constant voltage charger, a constant current charger, a taper current charger, a pulsed current charger, a negative pulse charger, an IUI charger, a trickle charger, and a float charger. Additional disclosure related power source and battery usage may be found in U.S. patent application Ser. No. 17/407,358, filed on Aug. 20, 2021 entitled "CONNECTOR AND METHOD FOR USE FOR AUTHORIZING BATTERY CHARGING FOR AN ELECTRIC VEHICLE," the entirety of each which is incorporated herein by reference.

A power source may also include a battery cell, or a plurality of battery cells connected in series into a module and each module connected in series or in parallel with other modules. Configuration of a power source containing connected modules may be designed to meet an energy or power requirement and may be designed to fit within a designated footprint in an electric aircraft in which an electric aircraft may be incorporated.

In an embodiment, and still referring to FIG. 1, the simulated power source may be used to provide a steady supply of electrical power to a load over the course of a flight by a vehicle or other electric aircraft. For example, the power source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source. Additional disclosure related to energy sources may be found in U.S. patent application U.S. Ser. No. 17/523,390 entitled "SYSTEM AND METHOD FOR AUTONOMOUS FLIGHT CONTROL WITH MODE SELECTION FOR AN ELECTRIC AIRCRAFT," the entirety of each which is incorporated herein by reference.

Continuing reference to FIG. 1, flight data 116 may be obtained from flight simulator 112 and actual flight data from a real aircraft. "Flight data" as used herein, refers to any information that can be obtained from a simulated flight or real-time flight. For example, energy source conditions, flight maneuvers, time, speed, and the like can be considered flight data. Flight data may include aerodynamic data, pilot control data, flight controller data, command data, or the like. Within flight data, energy source conditions may be obtained. A condition of the energy source may include state of charge, state of health, useful energy remaining, instantaneous available power, depth of charge, and the like.

Referring to FIG. 1, Flight maneuvers 124 may also be contained within flight data 116. "Flight maneuvers" as used herein, refers to any movement that an aircraft may exhibit. Flight maneuvers may be related to battery performance of an electric aircraft because the electric aircraft may exert more energy to conduct maneuvers. Data taken from flight maneuvers may provide information regarding a pilot's flight pattern that can be altered by way of coaching or conducting more flight simulations if needed. For example, flight maneuvers may consist of landing, taxiing, climbing, descending, takeoff, cruising, turning, and the like. An additional example, and without limitation, a sensor that detects flight maneuvers may denote a maneuver value displaying that a pitch angle of 2° above a horizon reference should be adjusted to 7° above a horizon reference as a function of one or more actuators acting on an aileron. Flight maneuvers may be recorded using pilot control inputs, flight control commands and the like. Flight maneuvers may be recorded using one or more maneuver sensors. A "maneuver value" as used herein, is a datum of measurement of the movements of an aircraft in relation to a neutral position. A "neutral position" may be a position where the aircraft is stable whether is it on the ground or in the air. A maneuver value may be detected and measured by a maneuver sensor. Once a sensor detects a maneuver value, the datum may be transmitted to processor 104, which is further explained below. Flight maneuvers 124 may also include a modification of an aircraft's altitude, thrust, forward thrust, reverse thrust, airspeed velocity, groundspeed velocity, heading direction, pitch angel, approach angel, angle of attack, and the like. In a non-limiting embodiment, any aerodynamic movements may be considered flight maneuvers. The term "aerodynamic movements" as used herein, refer to the aircraft's movement through the air including tilts, takeoff, landing, drag, and the like. Aerodynamic movements may utilize energy to conduct any associated maneuvers.

Still referring to FIG. 1, system 100 includes processor 104 communicatively connected to a flight sensor. A "flight sensor" as used herein, refers to any sensor that detects flight data. For example, flight sensors may include attitude sensors, altimeters, pressure sensors, moisture sensors, electrical sensors, torque sensors, force sensors, speed sensors, position sensors, displacement sensors, level sensors, proximity sensors, actuator sensors, sensors on pilot inputs, electrical sensors on the propulsors and the like. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. There may be at least a sensor connected to a pilot control. The at least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. A flight sensor may be configured to detect pilot input from at least pilot control. At least pilot control may include a throttle lever, inceptor stick, collective pitch control, steering wheel, break pedals, pedal controls, toggles, joystick and the like. One of ordinary skill in the art, upon reading the entirety of this disclosure would appreciate the variety of pilot input controls that may be present in an electric aircraft consistent with the present disclosure. Additional disclosure related to flight sensors may be found in U.S. patent application Ser. No. 17/197,427, filed on Mar. 10, 2021, and entitled "SYSTEM AND METHOD FOR FLIGHT CONTROL IN ELECTRIC AIRCRAFT," the entirety of which is incorporated herein by reference.

Referencing FIG. 1, flight sensor may include an optical sensor. As used in this disclosure an "optical sensor" is an electronic device that alters any parameter of an electronic circuit when contacted by visible or NIR light. Optical detectors may include, without limitation, charge-coupled devices (CCD), photodiodes, avalanche photodiodes (APDs), silicon photo-multipliers (SiPMs), complementary metal-oxide-semiconductor (CMOS), scientific CMOS (sCMOS), micro-channel plates (MCPs), micro-channel plate photomultiplier tubes (MCP-PMTs), single photon avalanche diode (SPAD), Electron Bombarded Active Pixel Sensor (EBAPS), quanta image sensor (QIS), spatial phase imagers (SPI), quantum dot cameras, image intensification tubes, photovoltaic imagers, optical flow sensors and/or imagers, photoresistors and/or photosensitive or photon-detecting circuit elements, semiconductors and/or transducers. APDs, as used herein, are diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When a reverse bias is less than breakdown voltage, a gain of an APD may be approximately linear. For silicon APDs this gain may be on the order of 10-100. The material of the APD may contribute to gains.

Still referring to FIG. 1, optical sensor may be configured to identify a topographical datum. As used in this disclosure a "topographical datum" is an element of datum representing the arrangement and/or location of a physical feature of a geolocation. For example, and without limitation, topographical datum may include one or more elements of datum denoting a mountain range, skyscraper, river, ridge, ocean, lake, vehicle, animal, person, street, field, tree, and the like thereof. In an embodiment, and without limitation, optical sensor may include a light radar component. As used in this disclosure a "light radar component" is an active imaging source that transmits light toward an object or field of interest and detects back-scattered or reflected light, measuring time of flight (ToF), interferometry, and/or phase of such back-scattered and/or reflected light to compute distances to, velocities, and/or accelerations of objects at points from which back-scatter and/or reflection occurred. In an embodiment, the wavelength of light may be outside the range of visible light; for instance, and without limitation, wavelength may be in the infrared range as described above. Light radar component may include a "flash lidar" component, mechanical or non-mechanical beam steering, light patterns, and/or computational imaging methods, such as plenoptic or other multi-aperture embodiments. In an embodiment, and without limitation, light radar component may include one or more optical elements for focusing, collimating, and/or transmitting light emitted by light source. In an embodiment, intensity and/or focus may default to minimally harmful settings, permitting allowing ToF ranging or the like to determine a distance to a nearest topographical data point and/or ground point. Light radar component may include detectors that may be sensitive specifically to a narrow band of wavelengths transmitted by light source, and/or may be sensitive to a range of wavelengths that includes the band transmitted by the light source. Detectors may be designed to react quickly to initial detection of photons, for instance through use of APDs or other highly sensitive detectors.

In an embodiment, and still referring to FIG. 1, optical sensor may be configured to calculate an in-air position as a function of the topographical datum. As used in this disclosure an "in-air position" is a relative location and/or orientation of an aircraft relative to the topographical datum. For example, and without limitation, optical sensor may perform a ToF calculation as a function of the one or more light radar components by firing pulses of light and measuring time required for a backscattered and/or reflected pulse to return.

As a further non-limiting example, ToF may be used to measure a distance from light radar component to a point from which light is scattered; this may be used, without limitation, to detect distance to a topographical datum such as a building. Distance may be computed using a single reading of ToF, by averaging two or more ToF readings, and/or measuring multiple returns to reduce false readings from clutter. ToF may be used to detect edges of objects such as an edge of a cliff. ToF may be used to generate an image, for instance by repeatedly capturing readings of ToF to different portions of an object and/or topographical datum; a three-dimensional surface contour of the object, such as facial features, details of an object a person is holding, or the like, may be rendered using the ToF data. ToF measurements may be processed to generate a depth map or point cloud, defined for the purposes of this disclosure as a set of Z-coordinate values for every pixel of the image, which may be measured in units of millimeters, micrometers, or the like. Depth map data may be combined with other imaging data; for instance, intensity or phase values of pixels in an infrared reading may be measured as proportional to an amount of light returned from a scene.

Still referring to FIG. 1, sensor may include a ranging sensor. As used in this disclosure a "ranging sensor" is an electronic device that receives, stores, and/or transmits one or more elements of spatial information. For example, and without limitation, ranging sensor may receive a temporal indicator. As used in this disclosure a "temporal indicator" is an element of datum denoting a time and/or temporal element. For example, and without limitation, temporal indicator may include a time period, wherein a time period is a magnitude of time elapsed, such as but not limited to seconds, minutes, hours, days, weeks, months, years, and the like thereof. For example, and without limitation, temporal indicator may denote a time period that aircraft has been in flight and/or traveling in a medium, such as but not limited to air. As a further non-limiting example, temporal indicator may denote a time period that aircraft has been idling and/or stationary. As a further non-limiting example, temporal indicator may denote a time period that aircraft has been at a cruising altitude. As a further non-limiting example, temporal indicator may denote a time period that aircraft has been climbing and/or descending from a cruising altitude. As a further non-limiting example, temporal indicator may denote a time period that a motor has been expending energy. As a further non-limiting example, temporal indicator may denote a time period that a torque and/or thrust has been exerted by a flight component, wherein a flight component is described below in detail.

In an embodiment, and still referring to FIG. 1, ranging sensor may be configured to calculate a distance as a function of the temporal indicator and the navigation signal. As used in this disclosure a "distance" is a measurement of travel and/or progress that has progressed. For example, and without limitation distance may denote a number of kilometers and/or miles that have been traveled. As a further non-limiting example, distance may denote a progression of distance traveled as a function of a required distance to be traveled. In an embodiment, distance may denote one or more replacement points. As used in this disclosure a "replacement point" is a distance and/or progression interval in which a component and/or aircraft has deteriorated. For example, and without limitation, replacement point may denote that an aircraft has 1200 km remaining prior to requiring maintenance. As a further non-limiting example, replacement point may denote that a flight component has 5% remaining prior to requiring a replacement component.

Still referring to FIG. 1, sensor datum may include an inertial measurement. As used in this disclosure an "inertial measurement" is an element of datum denoting one or more forces, angular rates, and/or orientations. For example, and without limitation, inertial measurement may include a measurement of 5 m/s2 for an aircrafts acceleration in a northeastern direction. In an embodiment, inertial measurement may include generating a moving map display. As used in this disclosure a "moving map display" is a digital map archive representing one or more position outputs. For example, and without limitation, moving map display may identify one or more movements, orientations, and/or velocities of aircraft over a digital map. In an embodiment, and without limitation, inertial measurement may be determined as a function of magnetic sensors or magnetometers such as Hall effect sensors, compasses such as solid-state compasses, or the like; one or more magnetometers may include a plurality of magnetometers, such as three or more magnetometers positioned to span three dimensions of possible orientation, so that any direction and magnitude of change in magnetic field in three dimensions may be detected and measured in three dimensions, possibly for measurement of the aircraft's orientation to the Earth's true North or detection of magnetic anomalies. In another embodiment, inertial measurement may be determined as a function of a MEMS sensor, inertial measurement unit (IMU), an accelerometer, wherein one or more accelerometers may include a plurality of accelerometers, such as three or more accelerometers positioned to span three dimensions of possible acceleration, so that any direction and magnitude of acceleration in three dimensions may be detected and measured in three dimensions, and the like thereof. In another embodiment, and without limitation, inertial measurement may be determined as a function of one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions.

Still referring to FIG. 1, according to some embodiments, sensor may include any of an electro-optical sensor, an imager, a machine-vision system, a high-speed camera, a thermal imaging camera, a multispectral camera, a pressure sensor, and the like. In some cases, sensor may be configured to sense a characteristic of an electric motor, such as without limitation as is on a propulsor. In some cases, sensor may be configured to sense any motor characteristic including, without limitation, current, vibration, stray flux, light polarization changes resulting from external magnetic field according to Faraday principle, partial discharge, acoustics, temperature, and the like. In some cases, sensor may be configured to sense a characteristic associated with a motor at a substantially steady-state. For example, in some cases motor current signal analysis may be performed under state-state motor conditions. Alternatively, sensor 104 may be configured to sense a characteristic associated with motor in a transient operating condition. Non-limiting exemplary transient operating conditions include motor start-up, motor load variations, plugging stop, regenerative braking, dynamic braking, acceleration, deceleration, supply frequency changes, and the like. In some cases, sensor may sense a motor characteristic which may be further analyzed, for example by way of one or more transforms. In some cases, motor characteristic may be analyzed using a time-frequency transform. Non-limiting time-frequency transforms may include any of discrete wavelet transform, undecimated discrete wavelength transform, wavelet packets, continuous wavelet transform, Hilbert-Huang transform, Wigner-Ville distribution, Choi-Williams distribution, and the like. In some cases, a discrete transform (e.g., discrete wavelet transform) may be advantageously utilized for continual monitoring of motor, because of reducing processing requirements of the discrete transform. Alternative or additionally, a continuous transform may be used for finer more accurate analysis. In some cases, a time-frequency transform may be used to analyze a motor current draw signal. Alternatively, or additionally a time-frequency transform may be used to analyze a motor vibration signal, a stray flux signal, and/or an optical polarization signal. An exemplary embodiment is provided below in which transient analysis of motor current during startup is analyzed using time-frequency transform.

Continued reference to FIG. 1, flight data 116 may comprise energy source condition 120. Energy source condition 120 may be measured using a sensor to detect changes in a condition datum. A "condition datum" as used herein, refers to a signal representing at least an element of data correlated to a measurable operating state of a power source. Measurable operating states relating to the condition of the energy source may include state of charge, state of heath, useful energy remaining, instantaneous available power, depth of charge and the like. For instance, and without limitation, a power source may need to be a certain temperature to operate properly; condition datum may provide a numerical value, such as temperature in degrees, that indicates the current temperature of power source. For example, and without limitation, a sensor correlated to the condition datum may be a temperature sensor that detects the temperature of power source 104 to be at a numerical value of 70° F. and transmits the corresponding condition datum to, for example, computing device 116. In another example, and without limitation, a sensor correlated to the condition datum may be a current sensor and a voltage sensor that detects a current value and a voltage value, respectively, of power source 104. Such condition datum may then be used to determine an operating condition of power source 104 such as, for example, a state of charge (SoC) or a depth of discharge (DoD) of power source. Energy source conditions may be the most optimal when the conditions represent the lowest amount of energy used. Energy source conditions may be lowest when the aircraft data indicates that the least amount of maneuvering is used. In a non-limiting example, energy source conditions are lowest when the least amount of energy economy is used up. The term "energy economy" refers to how far an aircraft can travel on a specific amount of energy. In a non-limiting embodiment, the amount of energy used for travel can depend on simulated or real time flight conditions, such as weather, wind, and the like. Additional disclosure related condition datums and associated sensors may be found in U.S. patent application Ser. No. 17/515,441, filed on Oct. 30, 2021, and entitled "SYSTEM AND METHODS FOR PRE-CONDITIONING A POWER SOURCE OF AN ELECTRIC AIRCRAFT," the entirety of which is incorporated herein by reference.

Referring to FIG. 1, flight data 116 may be used to generate a pilot performance 132. "Pilot performance" as used herein, refers to how a pilot operates an aircraft simulation or aircraft. Pilot performance may be assessed using a category system, ranking system, fuzzy set comparison, grading system, or the like. Pilot performance 132 may comprise of energy usage datum 136. "Energy usage datum" as used herein, refers to a pilot's energy usage data that is calculated during the flight simulation. Energy usage can be calculated using energy source condition sensor, maneuver sensor, and the like. Energy usage datum 136 may also be an element of data that denotes the amount of energy usage a pilot has gone through during a flight simulation. To optimize the electric aircraft's battery life, the pilot may be to minimize energy usage. For additional disclosure about gauging energy usage and battery life for an electric aircraft, refer to Ser. No. 17/852,215, titled "ASSEMBLY AND METHOD FOR GAUGING FUEL OF ELECTRIC AIRCRAFT", the entirety of each which is incorporated herein by reference.

Still referencing FIG. 1, machine-learning process 128 may be used to generate an energy efficiency datum 144. Retrieval of flight data 116 may prompt machine-learning process 128 to use pilot performance 132 and energy efficiency classifier 140 to generate energy efficiency datum 144. A "machine-learning process" as used herein, is a branch of artificial intelligence and computer science which focuses on the use of data and algorithms to imitate the way that humans learn. A machine-learning process also refers to the process of making a system that can learn and improve itself, after being specifically programmed. The term "energy efficiency datum" as used herein, refers to data that is obtained related to how much energy is used in relation to the amount of energy needed for a fight or flight simulation. For example, if a pilot's performance generates a low energy efficiency datum, that may mean that the pilot used more energy than was necessary to complete the flight or flight simulation. If a pilot's performance generates a high energy efficiency datum, this may mean that the pilot did not use much excess energy over the minimal amount that was needed to complete the fight or flight simulation. Machine-learning process 128 may use training data that may contain a plurality of inputs correlated to past flight data corresponding to a plurality of outputs correlated to energy efficiency data. In some embodiments, the plurality of inputs for the training data may include a subset of the flight data that is relevant to a pilot's energy efficiency. For example, plurality of inputs may comprise energy usage datums, energy source conditions, flight maneuvers and the like. The plurality of inputs may be an indication of how much energy the pilot is using during the flight simulation. The plurality of outputs of the training data includes information relating to the energy efficiency of a pilot's flight For example, if a pilot's simulation displayed many flight maneuvers, more energy may have been used so the machine-learning process may calculate a lower energy efficiency datum and then indicate through coaching a way to use fewer maneuvering procedures in the next flight simulation. A lookup table may be used to relate inputs of energy usage datums to outputs of energy efficiency datums. A "lookup table" as used herein, refers to an array or matrix of data that contains items that are searched. Lookup tables may be arranges as key-value pairs, where the keys are the data items being searched (looked up) and the values are either the actual data or pointed to where the data is located. Lookup tables relate inputs to outputs in order to mimic a function.

Still referring to FIG. 1, machine-learning process 128 may also use energy efficiency classifier 140 to generate energy efficiency datum 144. An "energy efficiency classifier" as used herein, refers to a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning process 128 may generate a classifier using a classification algorithm, defined as a process whereby a computing device and/or any module and/or component operating thereon derives a classifier from training data. Classification may be performed using without limitation linear classifiers such as without limitation logistic regression and/or naïve Bayes classifiers, nearest neighbor classifiers such as k-nearest neighbors' classifiers, support vector machines, least squares support vector machines, fisher's linear discriminant, quadratic classifiers, decision trees, boosted trees, random first classifiers, learning vector quantization, and/or neural network-based classifiers. Classification may use associations between pilot performances to generate energy efficiency datums. The term "associates" as used herein, refers to a connection or cooperative link between at least one pilot's performance. Energy efficiency classifier 140 may also be trained with pairs of pilot performance inputs and flight data that are correlated to other pilot's performances and flight data. A classifier trained with pairs of pilot's performance input may take the pilot performance and another input relating to flight data and generate a subsequent energy efficiency datum, while a classifier without trained pairs of data could just generate an energy efficiency datum based on the current status.

Still referring to FIG. 1, processor 104 may utilize a knowledge-based system (KBS) to use energy efficiency classifier 140 to categorize a pilot performance 132 response as energy efficient. As used in this disclosure, a KBS is a computer program that reasons and uses a knowledge base to solve complex problems. A KBS may scrape websites to gain knowledge for the knowledge base. As used herein, a "knowledge base" is an established collection of information and resources. The KBS has two distinguishing features: a knowledge base and an inference engine. A knowledge base may include technology used to store complex structured and unstructured information used by a computer system, often in some form of subsumption ontology rather than implicitly embedded in procedural code. Other common approaches in addition to a subsumption ontology include frames, conceptual graphs, and logical assertions. Next, an inference engine allows new knowledge to be inferred. For example, the inference engine may determine that pilot performance 132 has an energy efficiency classifier 140 with attributes that demonstrated high energy efficiency, the system may the infer that the energy efficiency datum 144 is high due to minimal flight maneuvers sourced from flight data 116. Inferences can take the form of IF-THEN rules coupled with forward chaining and backward chaining approaches. Forward chaining starts with the known facts and asserts new facts. Backward chaining starts with goals and works backward to determine what facts must be asserted so that the goals can be achieved. Other approaches include the use of automated theorem provers, logic programming, blackboard systems, and term rewriting systems such as CHR (constraint handling rules). The inference engine may receive constant feedback and self-learn based on previous classifications, as described through this disclosure, and recommendations to further refine and strengthen its recommendations.

Continuing reference to FIG. 1, energy efficiency datum 144 that the energy efficiency classifier 140 categorizes may be assigned a score based on the energy efficiency level of the pilot. For example, the energy efficiency classifier may generate a high level of energy efficiency that was displayed during the flight simulation. The energy efficiency may be scored with a numerical integer between 1-10, wherein 10 is a high energy efficiency. The scoring of energy efficiency may be determined using a scoring function as described below. For example, if pilot 108 used several unnecessary flight maneuvers, it may deduct points. The score may also be generated by self-ranking, which may be present in-flight simulator 112. For example, if pilot 108 receives an initial energy efficiency score of 2, they may be presented with additional coaching during the next flight simulation 112. Alternatively, if pilot 108 receives an energy efficiency score of 9, their flight data 116 may be used to help coach other pilots on how to fly more in line with pilot 108's flight data 116.

A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a process whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier, such as energy efficiency classifier 140, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) \ P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Continuing reference to FIG. 1, high energy efficiency datum 144 scores may trigger processor 104 utilize pilot 108 flight data 116 and pilot performance 132 to coach and train other pilots. The term "coaching" as used herein, refers to additional help that flight simulator may provide pilots. For example, coaching may take form of modelled barriers which can allow pilots to visualize a flight path easier. Other forms of coaching may be audio guidance, audio-visual aid, visual aid, mechanical triggers that can alert a pilot when they are veering off the flight path. Coaching may be used to help pilots become more energy efficient, so the battery lives of the electric aircrafts last longer. Pilot coaching may be initiated once a pilot has completed an initial flight simulation where energy condition datum and flight maneuver datums are calculated. Once processor 104 analyzes the datums, coaching may be employed to help pilots reduce their energy consumption and unnecessary flight maneuvers. Data for flight simulation coaching may come from flight optimization data, pilot data, and the like. Data for flight simulation coaching may also come from other pilot's flight data. Other pilot's flight data may be used if the other pilot has high energy efficiency data, uses minimal flight maneuvers, and the like.

Figure 2:
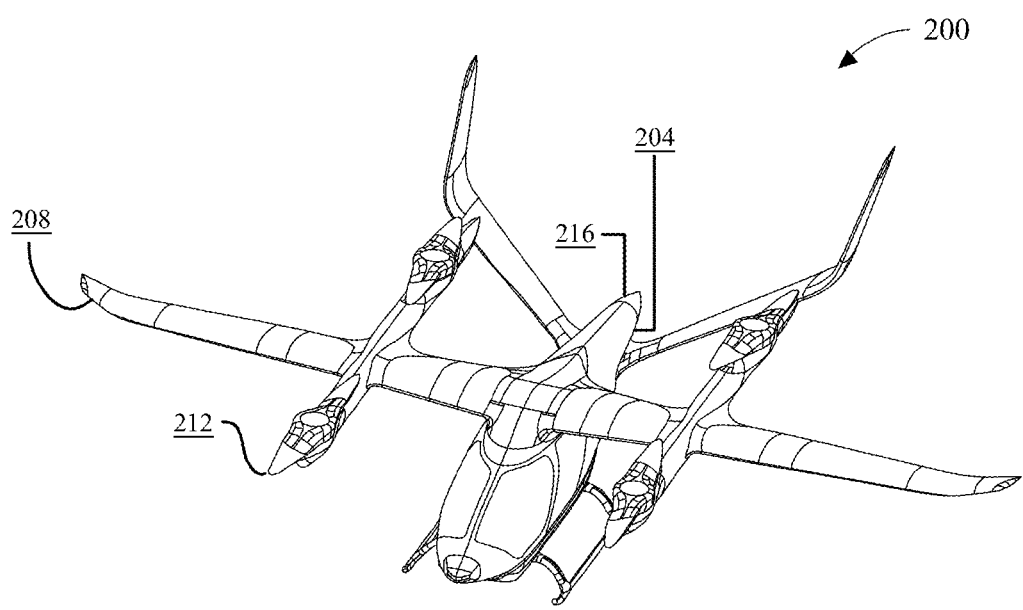
FIG. 2 is a diagrammatic representation of an exemplary embodiment of an aircraft.

Now referring to FIG. 2, an exemplary embodiment 200 of an electric aircraft is illustrated. In an embodiment, and without limitation, electric aircraft may include a fuselage 204. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

In embodiments, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In embodiments, aircraft skin can be anchored to formers and strings such that the outer mold line of the volume encapsulated by the formers and stringers comprises the same shape as electric aircraft 108 when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch (lbf/in2) or Pascals (Pa). In semi-monocoque construction stressed skin bears part of the aerodynamic loads and additionally imparts force on the underlying structure of stringers and formers.

Still referring to FIG. 2, it should be noted that an illustrative embodiment is presented only, and this disclosure in no way limits the form or construction of electric aircraft. In embodiments, fuselage 204 may be configurable based on the needs of the electric per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, electric aircraft may include a plurality of laterally extending elements 208 attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example., and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 208 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 2, electric aircraft may include a plurality of lift components 212 attached to the plurality of extending elements 208. As used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along a longitudinal axis, and a propeller produces torquer along a vertical axis. In an embodiment, lift component 212 may include a propulsor. In an embodiment, when a propulsor twists and pulls air behind it, it will, at the same time, push an aircraft forward with an equal amount of force. As a further non-limiting example, lift component 212 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and still referring to FIG. 2, lift component 212 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. As used in this disclosure an "fixed angle of attack" is fixed angle between the chord line of the blade and the relative wind. As used in this disclosure a "fixed angle" is an angle that is secured and/or unmovable from the attachment point. For example, and without limitation fixed angle of attack may be 2.8° as a function of a pitch angle of 8.1° and a relative wind angle 5.3°. In another embodiment, and without limitation, angle of attack may include a variable angle of attack. As used in this disclosure a "variable angle of attack" is a variable and/or moveable angle between the chord line of the blade and the relative wind. As used in this disclosure a "variable angle" is an angle that is moveable from the attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine the speed of the forward movement as the blade rotates.

In an embodiment, and still referring to FIG. 2, lift component 212 may be configured to produce a lift. As used in this disclosure a "lift" is a perpendicular force to the oncoming flow direction of fluid surrounding the surface. For example, and without limitation relative air speed may be horizontal to electric aircraft, wherein the lift force may be a force exerted in the vertical direction, directing electric aircraft upwards. In an embodiment, and without limitation, lift component 212 may produce lift as a function of applying a torque to lift component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. In an embodiment, and without limitation, lift component 212 may receive a source of power and/or energy from a power sources may apply a torque on lift component 212 to produce lift. As used in this disclosure a "power source" is a source that that drives and/or controls any component attached to electric aircraft. For example, and without limitation power source may include a motor that operates to move one or more lift components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 2, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which electric aircraft may be incorporated.

In an embodiment, and still referring to FIG. 2, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 2, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 2, electric aircraft may include at least a longitudinal thrust component 216. As used in this disclosure a "longitudinal thrust component" is a flight component that is mounted such that the component thrusts the flight component through a medium. As a non-limiting example, longitudinal thrust flight component 216 may include a pusher flight component such as a pusher propeller, a pusher motor, a pusher propulsor, and the like. Additionally, or alternatively, pusher flight component may include a plurality of pusher flight components. As a further non-limiting example, longitudinal thrust flight component may include a puller flight component such as a puller propeller, a puller motor, a puller propulsor, and the like. Additionally, or alternatively, puller flight component may include a plurality of puller flight components.

Figure 3:
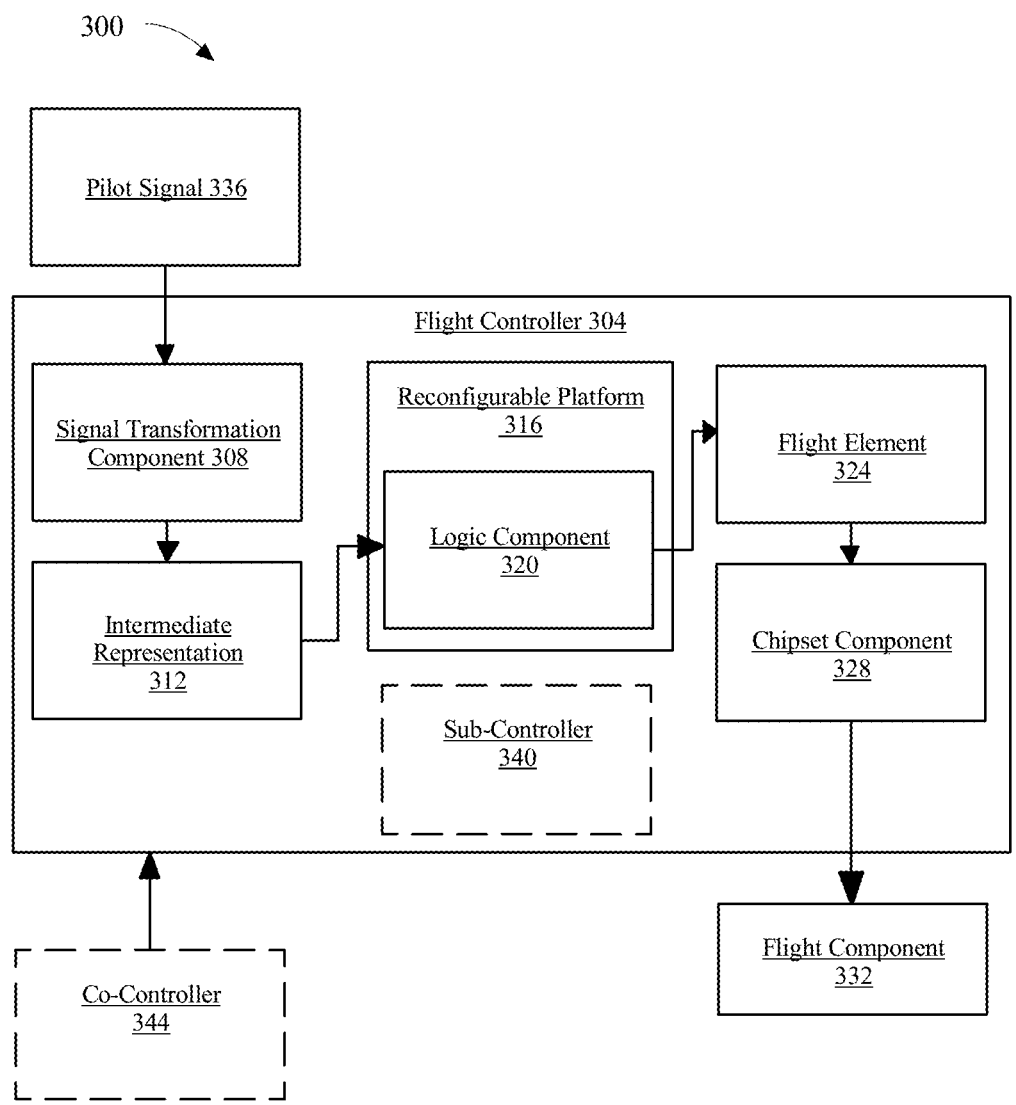
FIG. 3 is a block diagram of an exemplary embodiment of a flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
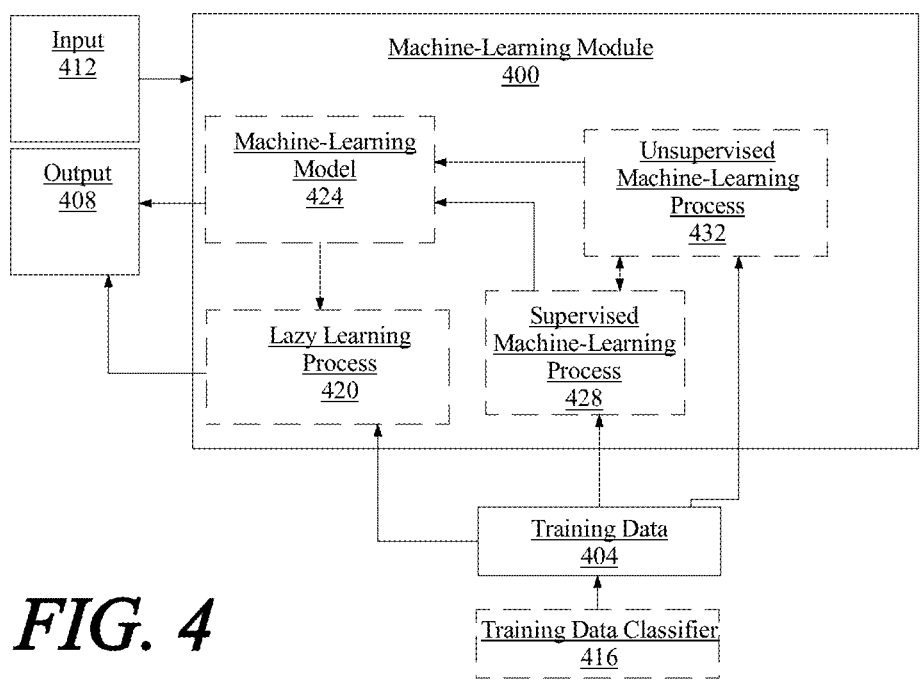
FIG. 4 is a block diagram of an exemplary embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 of a simulation model given data provided as inputs 412 of simulation data and/or operational data; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
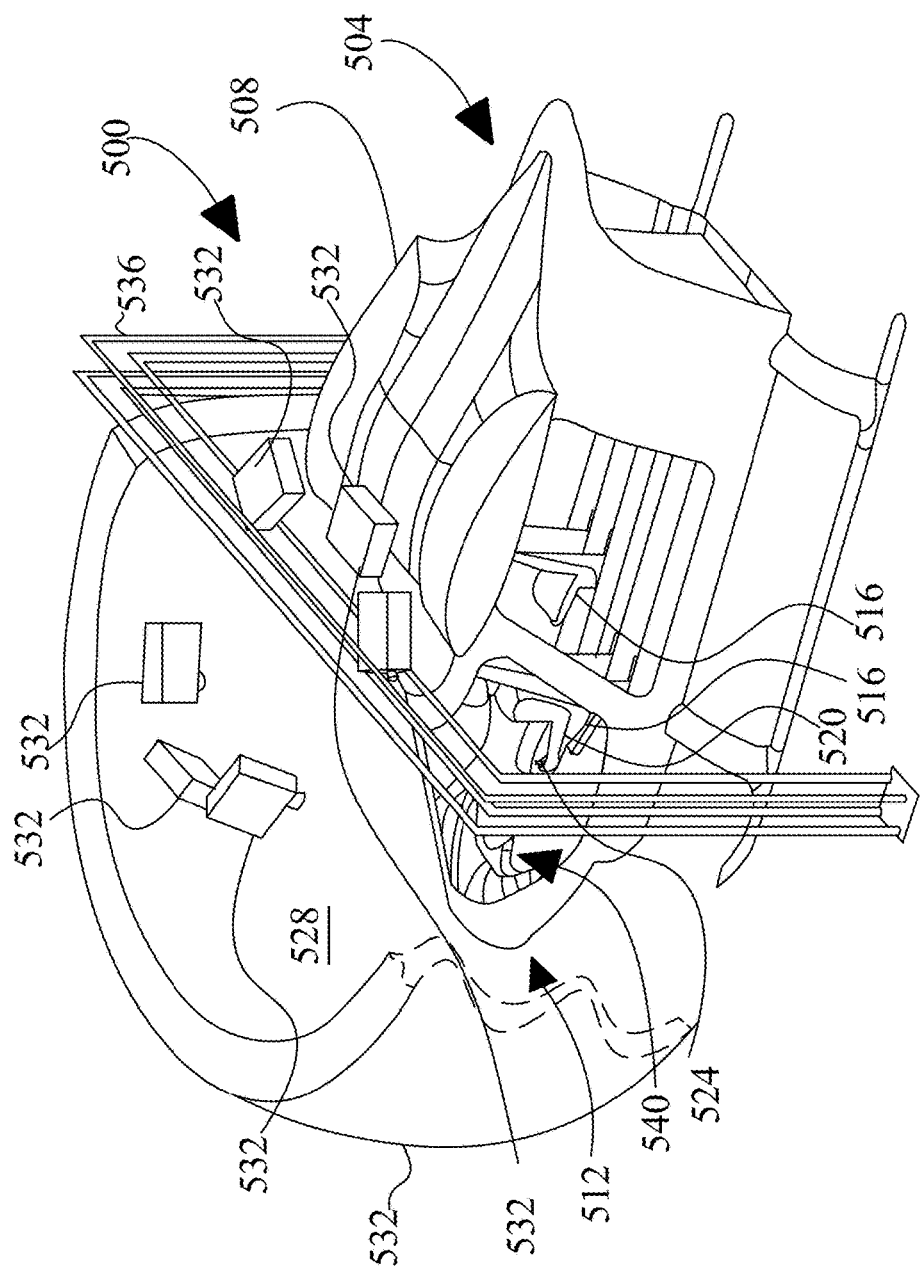
FIG. 5 illustrates an exemplary flight simulator.

Now referring to FIG. 5, a diagrammatic representation of an exemplary flight simulator is illustrated and known as system 500. The flight simulator illustrated here is categorized as a Thunderdome flight simulator, which enables multiple crew training missions and allows spectator to sit in the airframe; another type of flight simulator is explained herein with reference to FIG. 4. System 500 includes fuselage 504, flight components 508, cockpit 512, pilot seats 516, pilot 520, pilot inputs 524, concave screen 528, projectors 532, scaffolding 536, and computing device 540. Fuselage 504 and flight components 508 may be any fuselage or flight components explained herein with reference to FIG. 2. Fuselage 504 has an entrance to cockpit 512 which is the compartment the pilot 520, pilot controls, and pilot seats 516 are housed in. Cockpit 512 includes pilot inputs 524 which are configured to detect pilot datums. Pilot inputs 524 may be any gauge, throttle lever, clutch, dial, control, or any other mechanical or electrical device that is configured to be manipulated by pilot 520 to receive information. Flight simulator 500 also may include concave screen 528 facing fuselage 504; projectors 532 are directed at concave screen 528 and projectors 532 are each configured to project an image onto concave screen 528. Projectors 532 may be attached to or otherwise on fuselage 504 or projectors 532 may be attached to an independent supportive structure such as scaffolding 536. Flight simulator 500 also may include computing device 540, which is further explained herein with reference to FIGS. 1 and 9. Additional disclosure related electric aircraft flight simulators may be found in U.S. patent application Ser. No. 17/527,301, filed on Nov. 16, 2021 and entitled "SYSTEMS AND METHODS FOR A MOBILE FLIGHT SIMULATOR OF AN ELECTRIC AIRCRAFT," the entirety of which is incorporated herein by reference.

Figure 6:
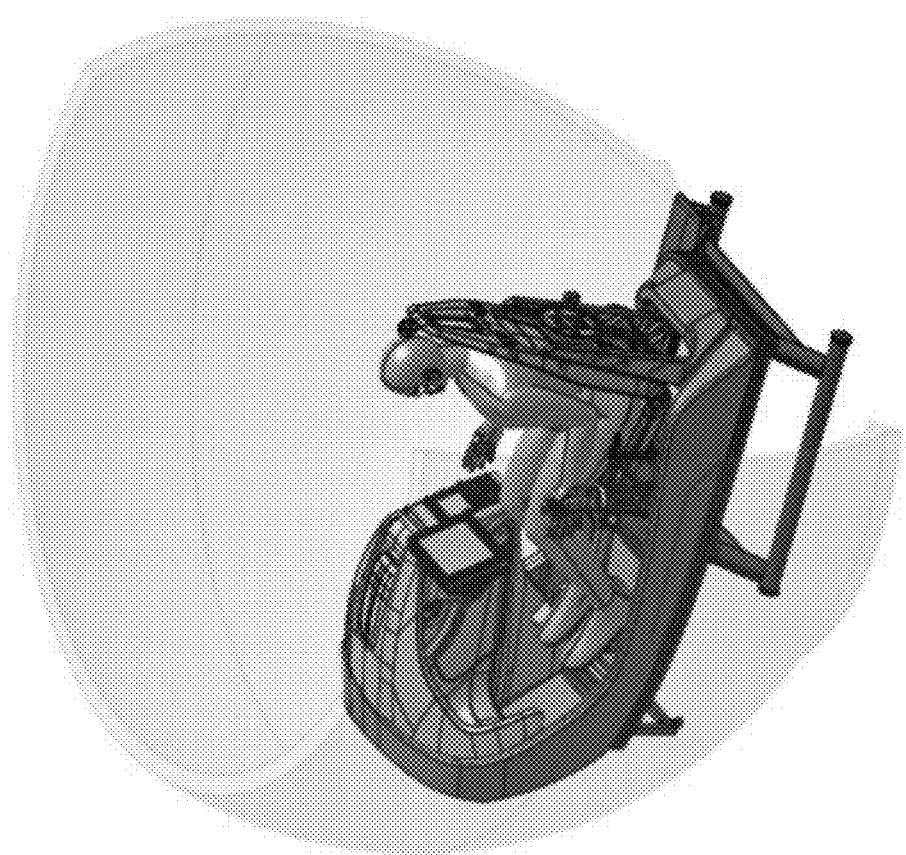
FIG. 6 illustrates an exemplary model of a microdome flight simulation.

Now referring to FIG. 6, an exemplary embodiment of a microdome flight simulator is illustrated. Microdome flight simulator is similar to a Thunderdome flight simulator, but does not include a fuselage, more than one pilot, as many projectors, or autopilot. It is used for recruitment, development, and training, but not for certification like the Thunderdome. Overall, the microdome is also smaller than the Thunderdome.

Figure 7:
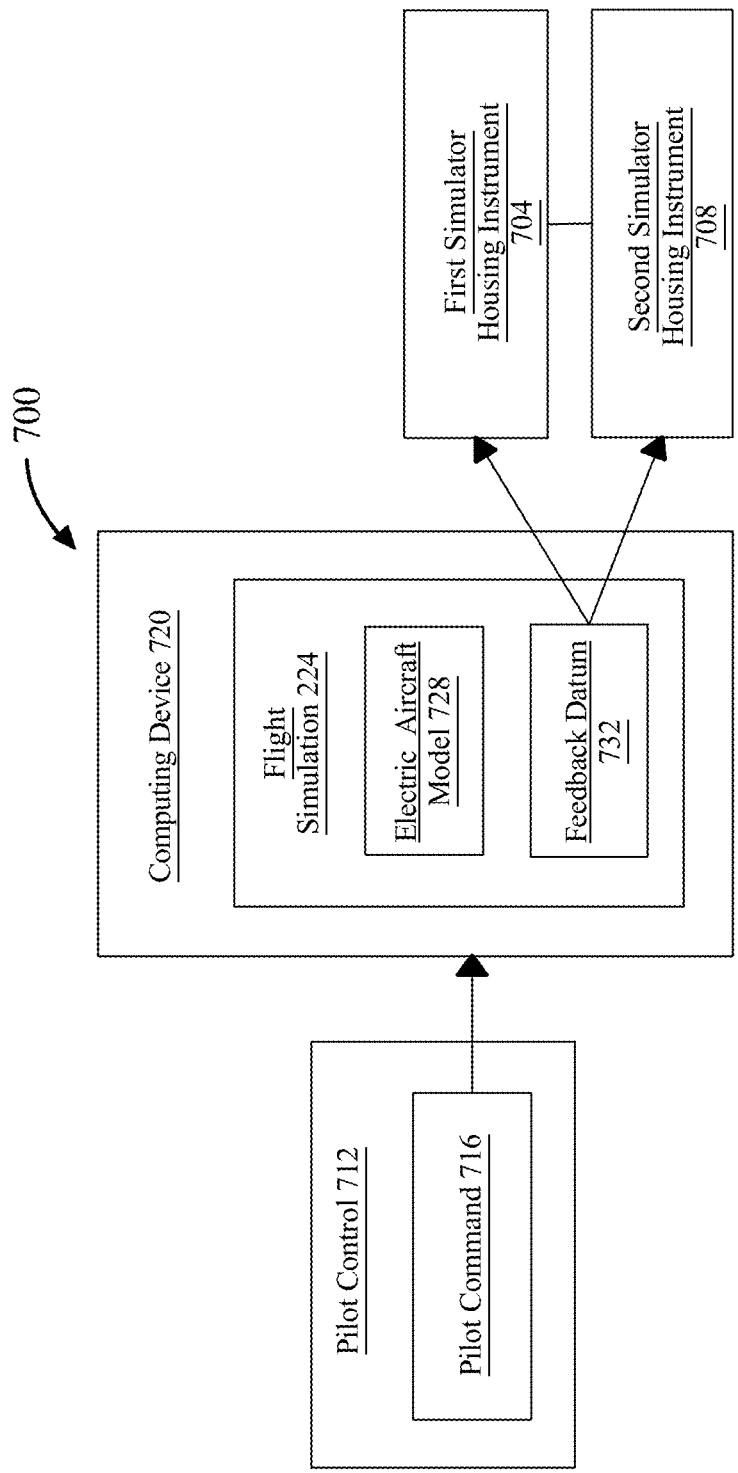
FIG. 7 illustrates an exemplary model of simulator housing.

Now referencing FIG. 7, system 700 includes a first simulator housing instrument 704 that houses a plurality of first flight simulator components. In this disclosure, a first "simulator housing instrument" is the first component in which the flight simulator is located in. Housed inside of the first simulator housing instrument is a plurality of first flight simulator components. In this disclosure, a "plurality of first flight simulator components" are the first group of pieces of technology that include the flight simulator. Flight simulator may include a plurality of flight simulator components that may include a seat, avionics controls, dashboard, the plurality of displays, inceptor stick, pedals, user device, a part replicating a fuselage, etc. Adjacent displays may be aligned next to each other in any order or formation. In a non-limiting embodiment, adjacent displays may include at least a projector. Adjacent displays may include a primary flight display configured to be at the center of the alignment of displays. Adjacent displays may be collapsible, modular, foldable, separable, etc. Flight simulator components may be modular, interchangeable, separable, collapsible, etc. The first simulator housing instrument may include any container used for storage, transportation, delivery, shipping, and the like. In a non-limiting embodiment, housing instrument may include a shipping container which may include a military grade shipping container. First group of modular flight simulator components may include a plurality of adjacent displays folded, a displays folded onto a flight simulator dashboard, etc. First group of modular flight simulator components may be configured to easily connect, assemble, integrate, etc, with a second group of modular flight simulator components.

Still referring to FIG. 7, system 700 includes a first simulator housing instrument 704 that houses a plurality of first flight simulator components. In this disclosure, a first "simulator housing instrument" is the first component in which the flight simulator is located in. Housed inside of the first simulator housing instrument is a plurality of first flight simulator components. In this disclosure, a "plurality of first flight simulator components" are the first group of pieces of technology that include the flight simulator. Flight simulator may include a plurality of flight simulator components that may include a seat, avionics controls, dashboard, the plurality of displays, inceptor stick, pedals, user device, a part replicating a fuselage, etc. Adjacent displays may be aligned next to each other in any order or formation. In a non-limiting embodiment, adjacent displays may include at least a projector. Adjacent displays may include a primary flight display configured to be at the center of the alignment of displays. Adjacent displays may be collapsible, modular, foldable, separable, etc. Flight simulator components may be modular, interchangeable, separable, collapsible, etc. The first simulator housing instrument may include any container used for storage, transportation, delivery, shipping, and the like. In a non-limiting embodiment, housing instrument may include a shipping container which may include a military grade shipping container. First group of modular flight simulator components may include a plurality of adjacent displays folded, a display folded onto a flight simulator dashboard, etc. First group of modular flight simulator components may be configured to easily connect, assemble, integrate, etc, with a second group of modular flight simulator components.

Still referring to FIG. 7, system 700 includes a second simulator housing instrument 708 which houses a plurality of second flight simulator components. In this disclosure, a second "simulator housing instrument" is the second component in which the flight simulator is located in. Housed inside of the second simulator housing instrument is a plurality of second flight simulator components. In this disclosure, a "plurality of second flight simulator components" are the second group of pieces of technology that include the flight simulator. Flight simulator may include a plurality of flight simulator components that may include a seat, avionics controls, dashboard, the plurality of displays, inceptor stick, pedals, user device, a part replicating a fuselage, etc. Adjacent displays may be aligned next to each other in any order or formation. In a non-limiting embodiment, adjacent displays may include 4 projectors. Adjacent displays may include a primary flight display configured to be at the center of the alignment of displays. Adjacent displays may be collapsible, modular, foldable, separable, etc. Flight simulator components may be modular, interchangeable, separable, collapsible, etc.

Still referring to FIG. 7, computing device 720 is configured to communicatively connect each first flight simulator component of the plurality of flight simulator components and each second flight simulator component of the plurality of flight simulator components. Computing device 720 may be a remote device configured to connect each modular flight simulator component. Computing device 720 may be configured to identify each modular flight simulator component to the first housing instrument 704 or second housing instrument 708. Computing device 720 may be configured to disconnect electronically the components of one group with the components of another group to allow for faster electronic connecting or reassembling of the components as a whole. Additional disclosure related electric aircraft flight simulation may be found in U.S. patent application Ser. No. 17/527,301, filed on Nov. 16, 2021 and entitled "SYSTEMS AND METHODS FOR A MOBILE FLIGHT SIMULATOR OF AN ELECTRIC AIRCRAFT," the entirety of which is incorporated herein by reference.

Figure 8:
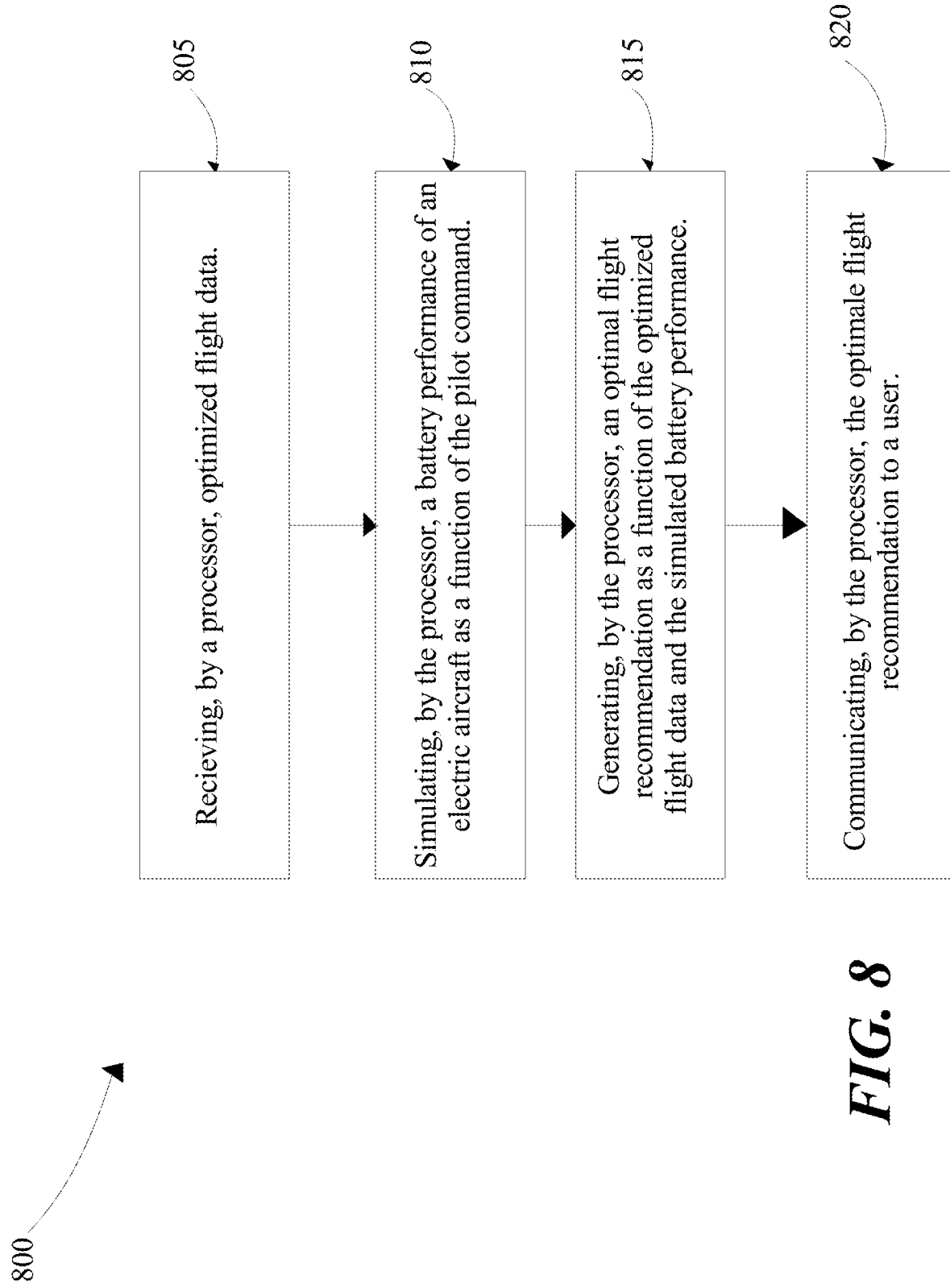
FIG. 8 illustrates a block diagram of a method for an electric aircraft coaching simulator.

Referring to FIG. 8, an exemplary embodiment 800 of a method for an electric aircraft coaching simulator is illustrated. At step 805, processor 104 receives optimized flight data from a flight simulation, as described above in FIGS. 1-7. Flight simulation may be performed by a pilot. A pilot may be able to attempt multiple flight simulations. Flight simulation data may be stored within a computing device for future use.

Still referring to FIG. 8, at step 810, processor 104 simulates a battery performance of an electric aircraft as a function of a received pilot command as described in FIGS.

1-7. Battery performance may be affected by energy conditions and flight maneuvers controlled by the pilot. Optimal battery performance may be considered efficient if the battery used is not substantially more than the battery use needed. A condition sensor and a maneuver sensor may be used to determine condition and flight maneuver data.

Still referring to FIG. 8, at step 815, processor 104 may generate an optimal flight recommendation as described in FIGS. 1-7. Optimal flight recommendations may be unique to each pilot. Optimal flight recommendations may require the use of coaching during a simulation to implement. Machine-learning may be used to generate optimal flight recommendations.

Still referring to FIG. 8, at step 820, processor 104 may use an integrated aircraft model as a function of the simulation ad described in FIGS. 1-7. An integrated aircraft model may use audio, audio-visual, and visual displays to mimic a real-time flight for the simulation. The simulation may use previous pilot's data to improve coaching methods.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
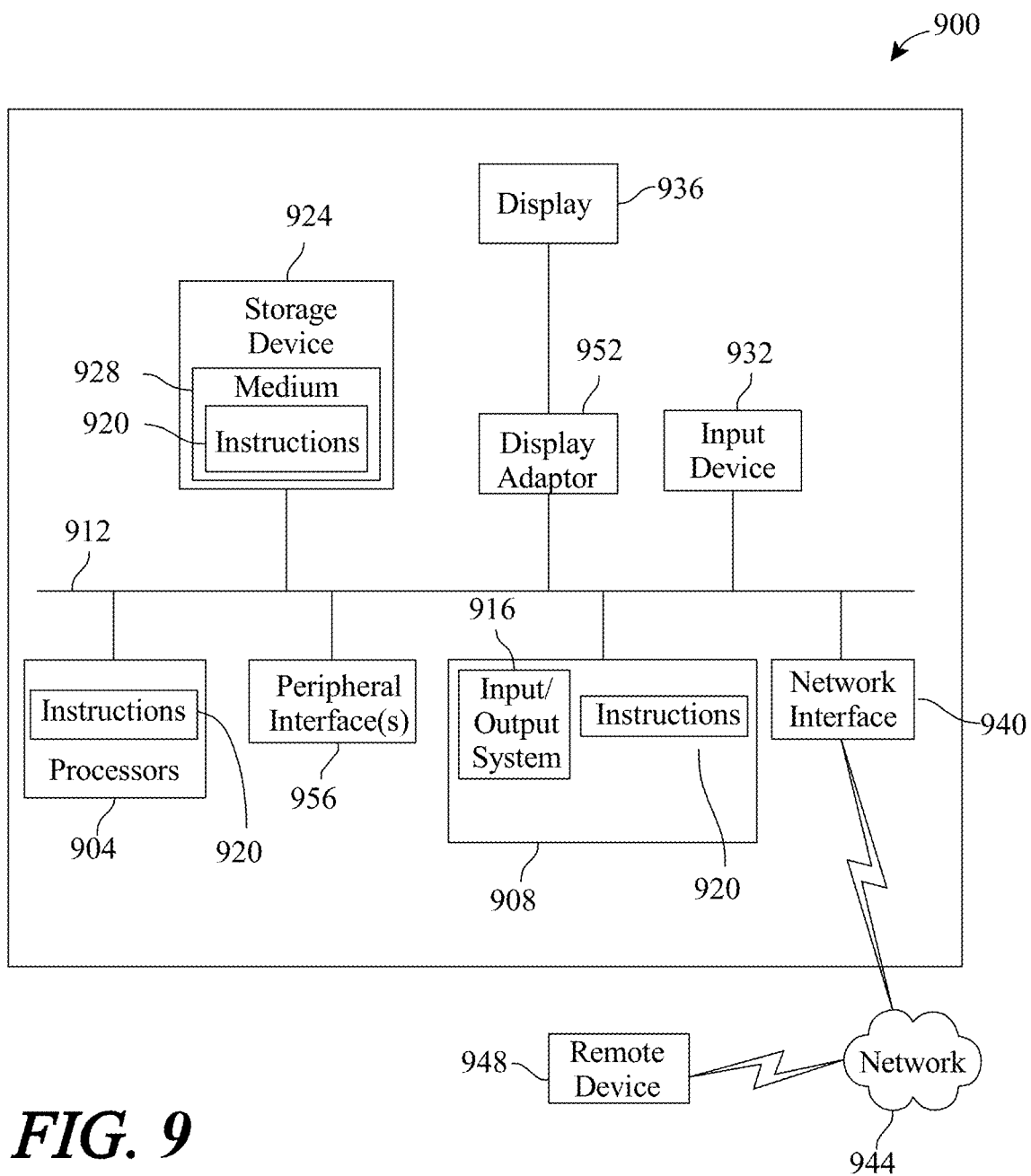
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 919 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 939, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an electric aircraft coaching simulator, wherein the system comprises:
   a pilot control configured to generate a pilot command as function of a user interaction with the pilot control;
   a computing device;
   at least a processor; and
   a memory communicatively connected to the at least a processor, the memory containing instructions configuring the at least a processor to:
   receive historical flight data;
   simulate performance of an electric aircraft as a function of the historical flight data and the pilot command, wherein the simulated performance of the electric aircraft comprises a simulated battery performance of the simulated electric aircraft;
   generate an optimal flight recommendation as a function of the historical flight data and the simulated battery performance, wherein generating an optimal flight recommendation comprises:
   receiving a pilot performance;
   determining an energy efficiency datum, utilizing a machine-learning model, based on the pilot performance, wherein the energy efficiency datum refers to energy used by pilot performance in relation to an amount of energy need for flight simulation; and
   assigning a score to the energy efficiency datum based on an energy efficiency level of the pilot; and
   communicate the optimal flight recommendation to a user.

2. The system of claim 1, wherein the memory contains instructions further configuring the at least a processor to validate simulated battery performance as a function of historical battery performance data of the historical flight data.

3. The system of claim 1, wherein simulating the simulated battery performance of the simulated electric aircraft further comprises:
   simulating a flight of the simulated electric aircraft as a function of the historical flight data;
   validating the simulated battery performance as a function of historical battery performance data of the historical flight data.

4. The system of claim 3, wherein simulating the simulated flight further comprises displaying a visual representation of the simulated further comprises adjacent displays.

5. The system of claim 1, further comprises a plurality of flight simulator components.

6. The system of claim 1, wherein generating an optimal flight recommendation further comprises generating an energy efficiency datum representative of the pilot's performance as a function of the pilot command.

7. The system of claim 6, wherein the energy efficiency datum is a function of an energy usage datum.

8. The system of claim 1, wherein generating an optimal flight recommendation further comprises:
   training a machine-learning model using training data comprising a plurality of inputs containing flight data correlated to a plurality of outputs containing an energy efficiency datum;
   receiving simulated flight data as a function of the pilot's performance;
   inputting the simulated flight data into the machine-learning model; and
   generating the optimal flight recommendation as a function of the machine-learning model and the simulated flight data.

9. The system of claim 1, wherein generating an optimal flight recommendation further comprises receiving an energy efficiency datum.

10. The system of claim 9, wherein the energy efficiency datum is a function of a pilot's performance.

11. A method for an electric aircraft coaching simulator, the method comprising:
   generating a pilot command as a function of a user interaction, using a pilot control;
   receiving, by at least a processor a computing device containing a memory, historical flight data;
   simulating, by the at least a processor, a battery performance of an electric aircraft as a function of the historical flight data and the pilot command;
   generating, by the at least a processor, an optimal flight recommendation as a function of the historical flight data and the simulated battery performance, wherein generating an optimal flight recommendation comprises:
      receiving a pilot performance;
      determining an energy efficiency datum, utilizing a machine-learning model, based on the pilot performance, wherein the energy efficiency datum refers to energy used by pilot performance in relation to an amount of energy need for flight simulation; and
      assigning a score to the energy efficiency datum based on an energy efficiency level of the pilot; and
   communicating, by the at least a processor, the optimal flight recommendation to a user.

12. The method of claim 11, further comprising validating, by the at least a processor, simulated battery performance as a function of historical battery performance data of the historical flight data.

13. The method of claim 11, wherein simulating the simulated battery performance of the simulated electric aircraft further comprises:
   simulating a flight of the simulated electric aircraft as a function of the historical flight data;
   validating the simulated battery performance as a function of historical battery performance data of the historical flight data.

14. The method of claim 13, wherein simulating the simulated flight further comprises displaying a visual representation of the simulated further comprises adjacent displays.

15. The method of claim 11, further comprising simulating using a plurality of flight simulator components.

16. The method of claim 11, wherein generating an optimal flight recommendation further comprises generating an energy efficiency datum representative of the pilot's performance as a function of the pilot command.

17. The method of claim 16, wherein the energy efficiency datum is a function of an energy usage datum.

18. The method of claim 11, wherein generating an optimal flight recommendation further comprises:
   training a machine-learning model using training data comprising a plurality of inputs containing flight data correlated to a plurality of outputs containing an energy efficiency datum;
   receiving simulated flight data as a function of the pilot's performance;
   inputting the simulated flight data into the machine-learning model; and
   generating the optimal flight recommendation as a function of the machine-learning model and the simulated flight data.

19. The method of claim 11, wherein generating an optimal flight recommendation further comprises receiving an energy efficiency datum.

20. The method of claim 19, wherein the energy efficiency datum is a function of a pilot's performance.

* * * * *